United States Patent [19]
Hönmann

[11] 3,988,973
[45] Nov. 2, 1976

[54] AIR OUTLET

[75] Inventor: Winfried Hönmann, Stuttgart, Germany

[73] Assignee: LTG Lufttechnische GmbH, Stuttgart, Germany

[22] Filed: Nov. 29, 1974

[21] Appl. No.: 528,445

[30] Foreign Application Priority Data
June 24, 1974 Germany............................ 2430216

[52] U.S. Cl................................. 98/40 C; 98/40 A; 98/40 D; 239/562
[51] Int. Cl.² ........................................ F24F 13/06
[58] Field of Search............ 98/40 A, 2, 40 N, 40 C, 98/40 V, 114, 108; 239/562, 587; 251/309; 137/625.31, 625.32

[56] References Cited
UNITED STATES PATENTS

| 2,814,978 | 12/1957 | Sallou .................... | 98/40 A |
| 3,599,877 | 8/1971 | Goldschmied ............. | 239/562 |
| 3,736,858 | 6/1973 | Mercier ..................... | 98/40 C |
| 3,824,910 | 7/1974 | Temming .................. | 98/40 A |

FOREIGN PATENTS OR APPLICATIONS

| 2,001,931 | 7/1971 | Germany ................... | 98/40 C |
| 2,222,453 | 11/1973 | Germany ................... | 98/40 A |
| 580,093 | 8/1946 | United Kingdom ......... | 98/40 A |

Primary Examiner—John J. Camby
Assistant Examiner—Henry C. Yuen
Attorney, Agent, or Firm—Edwin E. Greigg

[57] ABSTRACT

An air inlet through which supply air is blown into the room of a building or the like including at least one roller-shaped elongated blowing element, two mutually parallel disposed bearing shells between which the blowing element is mounted and at least one spring clamp. The spring clamp engages both bearing shells and retains them in assembly with the blowing element to thereby hold the blowing element in a form-fitting and positive force-transmitting manner while permitting the blowing element to pivot about its longitudinal axis. The blowing element includes walls defining a passage through which the air passes into the room. In one embodiment the walls define projections which in turn define an inlet passage for the blowing element which is narrower in width than its outlet passage.

16 Claims, 3 Drawing Figures

U.S. Patent  Nov. 2, 1976  3,988,973
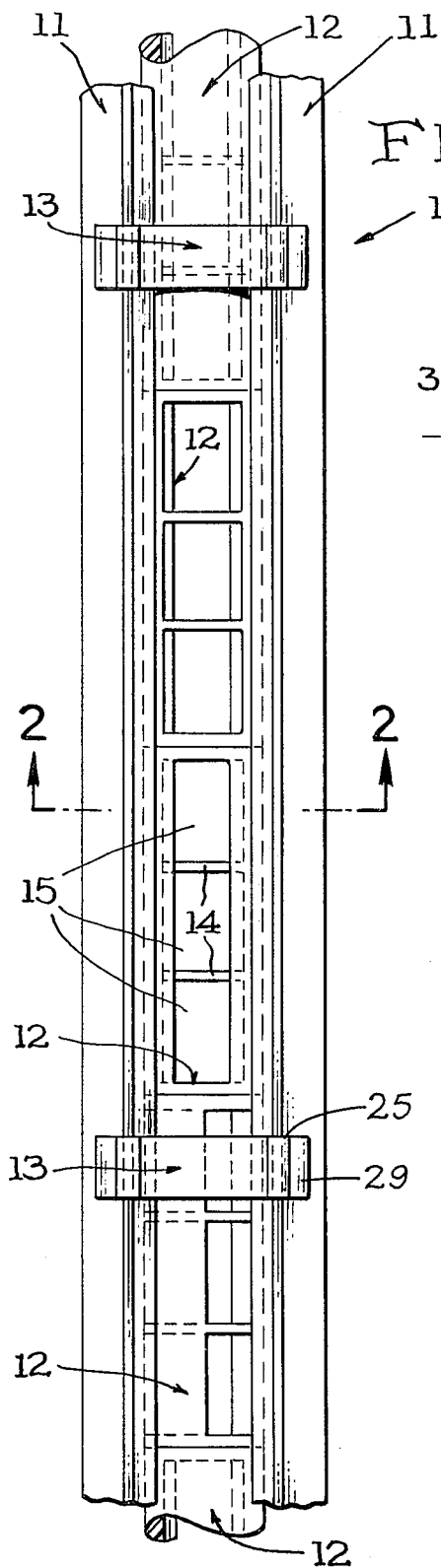
FIG. 1.
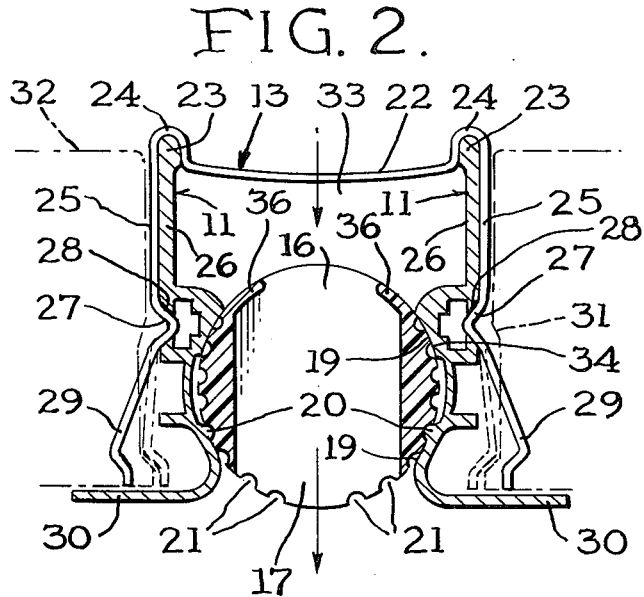
FIG. 2.
FIG. 3.

AIR OUTLET

BACKGROUND OF THE INVENTION

The invention relates to an air inlet for blowing supply air into the room of a building or the like, preferably a ceiling air inlet having at least one roller-shaped blowing element, but preferably having a plurality of roller-shaped blowing elements disposed one behind the other in a row, wherein each individual blowing element has at least one passage through which supply air may flow transversely to the longitudinal direction of the blowing element, and in which the blowing elements are mounted into mutually parallel bearing shells and pivotably about their longitudinal axes.

An air inlet of this type is shown and described for example in the German Offenlegungsschrift (laid-open application) DT-OS No. 2 222 453 filed on May 8, 1972.

OBJECT AND SUMMARY OF THE INVENTION

It is an object of the invention to simplify the manufacture and the assembly of such an air inlet and to guarantee a relatively easy rotatability of the blower elements in a simple manner.

This object and others are accomplished according to the invention by the provision of an air inlet of the above-described type, wherein the two bearing shells are held together by means of spring clamps which press the bearing shells against the blower element or elements in a form-fitting and positive force-transmitting manner.

It is possible according to the invention for this air inlet to consist of only the two bearing shells, the blower element or elements held between them and the spring clamps holding these parts together. Therefore, this air inlet may consist of a minimum of parts each of which is capable of being manufactured in a simple and inexpensive manner. Additionally, the air inlet forms a single constructional unit which is held together in the simplest manner and only by means of the spring clamps.

The air inlet according to the invention may, for example, have lengths of 20 cm to 2 m, without limiting the invention thereto. The spring clamps require only a very small space and do not impede the passage of air through the air inlet.

Since the spring clamps press the bearing shells against the blower element in an elastic manner, the friction between the blower element and the bearing shells which press against it cannot become excessively large, so that it is always guaranteed that the blower element can be rotated with relatively small forces. This is true for the case in which the blower element attaches to the bearing shells only with frictional adhesion or for the case in which a detent mechanism is provided between the blower element and the bearing shells. The latter is to be regarded as preferred. The length of the individual blower element can preferably be that described in DT-OS 2,222,453, because then it is possible to adjust in each case optimum inblowing conditions into the particular room under consideration, irrespective of whether cooled or heated or neutral supply air is blown into the room and regardless of the other conditions in the room. However the invention is not limited thereto, because it may be used even with blower elements whose lengths deviate from the teaching of DT-OS No. 2,222,453 and may be used with advantage, for example, even if only a single blower element is present, although it is advantageous if the air inlet consists of several blower elements which may be rotated mutually independently.

Preferably the bearing shells may be embodied as profiled rails, i.e., they may have a constant cross-sectional profile over their entire length.

Preferably also the bearing shells may consist of metal, particularly aluminum, but may, if necessary, also be formed of other materials.

Preferably the blower elements can be made of synthetic plastic or other materials.

The spring clamps are to be so embodied that, by their action, the two bearing shells are pressed against the blower element or elements contained between them and that, thereby, the spring clamps themselves are held together, so that the spring clamps have the effect of holding such a constructional unit together overall.

Preferably, it can be provided that all the spring clamps have the same form; but, of course, it is also possible to make at least two spring clamps with different forms.

In order to secure the relative position of the two bearing shells, it is suitable if spacer elements are disposed between them at the back of the blower elements and at a distance therefrom, wherein each such spacer element can be a single-piece member of a bearing shell or can be a separate part. In a preferred embodiment, it is provided that the spacing elements are formed by middle portions of the spring clamps, which engage rear end-regions of the two bearing shells in a form-fitting manner and which determined their mutual separation.

It is particularly suitable if the spring clamps extend in planes which are perpendicular to the rotational axis of the blower element or elements, and suitably rearward of the blower elements.

Suitably, these spring clamps can be substantially U-shaped and preferably symmetric with respect to the longitudinal median plane of the air inlet. It is also particularly advantageous if the two legs of the spring clamps have projections which engage longitudinal grooves formed on the outside surface of the two bearing shells and if the legs originate at regions of the spring clamps which lie against the rearward ends of the bearing shells.

As has already been mentioned, it is particularly advantageous to secure each blower element in the bearing shells against unintentional rotation by means of a detent mechanism.

Suitably, this detent mechanism can be so embodied that the blower element is provided with indentations and that at least one bearing shell is provided with at least one detent projection for engagement in such indentations and for maintaining the adjusted angular position of the particular blower element. Due to the elastic mounting of the two bearing shells, it is guaranteed that, in spite of the detent mechanism, the blower element may be rotated without difficulty and by forces which can be determined in advance.

Furthermore, it is suitably provided that the spring clamps have free end-regions at both sides of the bearing shells, these end-regions serving to hold the air inlet in an associated opening, for example, in an associated opening of an air box which carries the supply air to the air inlet or in some other opening, for example an opening in a ceiling, an intermediate ceiling, a wall, etc.

BRIEF DESCRIPTION OF THE DRAWING

The drawing shows an exemplary embodiment of the invention.

FIG. 1 shows a rear view of a preferred exemplary embodiment of a novel air inlet in partial representation, wherein the illustrated blower elements are adjusted in different angular positions.

FIG. 2 is a section through FIG. 1 as seen along the sectional line 2—2 and in enlarged representation; and FIG. 3 is a region from FIG. 2 in enlarged representation.

Identical elements have the same reference numerals in the drawing.

DESCRIPTION OF THE PREFERRED EMBODIMENTS

FIG. 1 shows a rear view section of a novel air inlet 10 interrupted at both ends. This air inlet 10 consists of two precisely identically formed profiled rails 11, mutually disposed in mirror-image configuration, a plurality of roller-shaped blower elements 12, rotatably mounted by means of these two profiled rails and of a plurality of substantially U-shaped spring clamps 13 which hold the profile rails 11 and the blower elements 12, inserted therein, together. The blower elements 12 have a form clearly shown in FIGS. 1 and 2. Each of the two profiled rails in this preferred exemplary embodiment has a length corresponding to an integral multiple of the length of an individual blower element 12. All blower elements 12 are embodied exactly identical, and can be rotated mutually independently, preferably the blower elements 12 are made of synthetic material in this exemplary embodiment. The two profiled rails 11 which form two bearing shells for bearing the blower elements 12 are made of metal in this exemplary embodiment and, preferably, of aluminum. The spring clamps 13 are relatively narrow spring clamps made, for example, of burnished strip spring steel, which might also be designated as spring brackets.

FIG. 1 is a drawing to scale. Therefore, in this exemplary embodiment, the individual blower element 12 has a length of approximately 6 cm. It is provided with an air passage which is sub-divided by two thin intermediate walls 14 into three equally large opening passages 15 of rectangular cross section, wherein the inlet aperture 16 located upstream, has a somewhat smaller width than has the outlet aperture 17 at the downstream end. In this preferred exemplary embodiment, the intermediate walls 14 are so thin that the supply air stream flowing out of a blower element may be considered to be a single stream of rectangular cross section. The width of the lower outlet aperture in this exemplary embodiment is approximately 12 mm, so that, in this case, the ratio of length of the blower element to the thickness of the air stream flowing out of it is approximately 5:1. The two profiled rails can be, for example, 30 cm in length. In that case, five blower elements are disposed in a row, immediately adjacent and one behind the other. Of course, other lengths of profiled rails are possible, such that any desired plurality of blower elements can be disposed, one behind the other in a row, between these rails. It is also an advantage that, at any time subsequently, the blower elements or individual ones of the blower elements can be exchanged without difficulty for blower elements having different air passage cross sections and/or lengths.

Since the blower elements 12 are mounted so as to be independently rotatable, they may be adjusted to mutually independent, desired angular positions, so that for any condition which may occur, in each case optimum blowing relationships may be set up for blowing air into the particular room, as is described in DT-OS No. 2,222,453.

Each profiled rail 11 has two bearing surfaces 19, disposed at an angular separation from one another, and adapted to the outside diameter of the blower elements. For each rail 11 the lower of these two bearing surfaces has a detent projection 20 extending over the length of the rail. These detent projections 20 can engage any one of a number of detent grooves 21 disposed in the circumference of the blower elements 12 and extending in the longitudinal direction of the blower elements, for the purpose of maintaining in each case the adjusted angular position of the blower elements 12. Actually, it is sufficient if a single one of the two profiled rails had such a detent projection 20. However, for reasons of inexpensive manufacture, it is suitable to make both profiled rails identical, so that both rails will have a detent projection. The detent grooves 21 are so disposed that, within the possible angular region of adjustment of the blower element, both of the profiled projections 20 are simultaneously opposed by detent grooves 21 of the blower element 12, so that, in each case, both profiled projections 20 can engage the detent grooves 21.

The detent mechanism secures the particular angular position of the blower elements which have been set and also facilitates the angular setting of the blower elements, because, during the adjustment, the operator senses each detent action and, beginning for example with the middle position of the blower element shown in FIG. 2, he may exactly set the desired angular position by turning the blower element and counting the number of detent actions. Since the detent projections 20 of the profiled rails 11 extend over their length, the detent grooves 21 of the blower elements 12 also extend over the length of the corresponding circumferential surfaces of the blower elements.

The profiled cross sections of the profiled rails 11 and of the spring clamps 13 are embodied in the manner clearly visible in FIG. 2. Each spring clamp 13 has a middle portion 22, which is disposed in a form-fitting manner between the two rearward end-regions 23 of the profiled rails 11, and serves as a spacer member. Adjacent to both sides of this middle member 22 are U-shaped intermediate regions 24 of the spring clamp 13 which extend over the upper end-regions 23 of the profiled rails 11 in a form-fitting manner, so that the U-shaped regions 24 lie against these two end-regions 23 both inside, on top and also on the outside thereof. The other legs 25 of the spring clamp 13 lie against mutually parallel plate like regions 26 of the profiled rail 11 which extend beyond the blower elements 12 and, approximately at the middle of the upper half of the blower elements, the two legs 25 bulge to form inwardly directed nose-shaped projections 27. The projections 27 engage longitudinal slots 28 in the profiled rails in a form-fitting manner. Adjacent to these nose shaped projections 27 are free end-regions 29 of the legs of the spring clamp 13, which extend close to lower horizontal flanges 30 of the profiled rails 11 and which are bent inwardly in the region of their free ends. This extension of the legs 25 beyond the projections 27 has for its purpose to create elastic regions 29 in the spring clamp, by means of which the air inlet 10, formed as a structural unit, can be held in an associated opening, for example, in a shaft 31 of a supply-air box 32 illustrated partially by broken lines.

This shaft 31 can have, for example, a cross section as shown in broken lines, wherein projections protrude inwardly near the bottom end behind which the free elastic end regions 29 are engaged when this air inlet is located in its inserted condition and thus effect secure but releasable detented holding of the air inlet 10 in this opening. The air inlet 10 disposed according to FIG. 2 serves for blowing supply air into a room located below this air inlet.

It is also possible to hold the air inlet 10 by means of the spring clamps 13 in an opening having uniformly straight side walls and to do so in force-transmitting manner. The spring clamps 13 always make possible a simple releasable holding of the air inlet 10 in an associated opening and make the provision of other holding means superfluous.

The plate-like regions 26 of the profiled rails 11 define a first air chamber 33 which leads into a second chamber 34 defined by the walls of the profiled rails 11 which contain the bearing surfaces 19. As can be seen from FIG. 2, the blower elements 12 or control means are mounted within the second chamber 34. Preferably, the walls of the blower elements are provided with arcuate projections 36 which define the inlet aperture 16.

The air inlet 10 has quite a series of advantages such as the simple construction of its members 11, 12, 13; a secure mounting, free of play, and with detenting of the blower elements 12; easy rotation of the blower elements 12; a minimum number of differently shaped parts; simple assembly of the air inlet and simple installation of the air inlet in an associated opening; easy and rapid exchange of any member of this air outlet, etc.

In addition, the arcuate projections or spoilers 36 have been shown to be especially advantageous because these make the Coanda-effect, if it is desired, more stable, and further these spoilers reduce the ratio of length to thickness of the jet below which the Coanda-effect does not occur.

What is claimed is:

1. An air inlet means through which supply air is blown into the room of a building or the like for controlling the occurrence of the Coanda effect comprising, an elongated body having spaced walls which define a first air region and a second region lying parallel thereto and coextensive with said first air region, said second region having an inlet opening into said first air region and a longitudinally extending outlet area, a plurality of axially aligned air control means mounted and supported in said second region, each air control means having side walls which define an air passageway having an inlet opening and an outlet opening through which air from said first air region to a zone lying beyond said outlet area, wherein the width of said passageway at said outlet opening is approximately equal to the width of said longitudinally extending outlet area.

2. An air inlet means through which supply air is blown into the room of a building or the like for controlling the occurrence of the Coanda effect comprising, an elongated body having spaced walls which define a first air region and a second region lying parallel thereto and coextensive with said first air region, said second region having an inlet opening into said first air region and a longitudinally extending outlet area, a plurality of axially aligned air control means mounted and supported in said second region, each air control means having side walls which define an air passageway having an inlet opening and an outlet opening through which air from said first air region flows, and which converge at the inlet opening so that said inlet opening is narrower than said outlet opening, thereby controlling emission of air from the said first air region to a zone lying beyond said outlet opening.

3. An air inlet as defined in claim 2, wherein each air control means further has at least one intermediate wall which extends substantially transversely between said side walls thereby subdividing the axial extent of said passageway into separate passageways.

4. In an air inlet through which supply air is blown into the room of a building or the like, preferably from the ceiling of the room, including at least one roller-shaped blowing element, having at least one passageway through which air may flow transversely to the longitudinal direction of the blowing element, and two mutually parallel disposed bearing shells between which the blowing element is mounted for pivotal motion about its longitudinal axis, the improvement comprising at least one spring clamp, wherein each bearing shell includes a curved inner surface portion which substantially conforms to the curvature of the outer surface of the blowing element, and wherein said at least one spring clamp engages both bearing shells for retaining said bearing shells in assembly with the blowing element such that the outer surface of the blowing element and the curved inner surface portion of each bearing shell assume a form-fitting relationship with at least a partial engagement of the outer surface of the blowing element and the curved inner surface portion of each bearing shell, establishing thereby a positive force-transmission between the assembled elements.

5. The air inlet as defined in claim 4, including a plurality of blowing elements arranged in a row, in assembly with said bearing shells, and a plurality of spring clamps arranged along said row to engage the bearing shells.

6. The air inlet as defined in claim 4, wherein the bearing shells are embodied as profiled rails.

7. The air inlet as defined in claim 4, wherein said spring clamp has a substantially U-shaped cross section.

8. The air inlet as defined in claim 7, wherein each bearing shell defines a rear end region which in turn defines a terminus of the bearing shell situated upstream of the blowing element, and wherein said spring clamp has a middle portion which in assembly is disposed in the manner of a spacing element between the two rear end regions of the bearing shells and engages the two rear end regions, said middle portion thereby determining the mutual separation of said bearing shells.

9. The air inlet as defined in claim 7, wherein said spring clamp has a free end region extending from at least one of its side walls, said free end region being adapted to hold the air inlet in an associated opening in the structure of the building or the like.

10. The air inlet as defined in claim 9, wherein said spring clamp has a free end region extending from both of its side walls.

11. In an air inlet through which supply air is blown into the room of a building or the like, preferably from the ceiling of the room, for controlling the occurrence of the Coanda effect including at least one roller-shaped blowing element side walls defining at least one passageway through which air may flow transversely to the longitudinal direction of the blowing element, said passageway having an inlet opening and an outlet opening in the direction of air flow, said side walls having converging projections at the inlet side of the passageway, thereby defining an inlet opening which is narrower in width than its corresponding outlet opening, and two mutually parallel disposed bearing shells between which the blowing element is mounted for pivotal motion about its longitudinal axis, the improvement comprising at least one spring clamp, wherein each bearing shell includes a curved inner surface portion which substantially conforms to the curvature of the outer surface of the blowing element, and wherein said at least one spring clamp engages both bearing shells and presses said bearing shells against the blowing element thereby retaining said bearing shells in assembly with the blowing element such that the outer surface of the blowing element and the curved inner surface portion of each bearing shell assumes a form-fitting relationship with at least a partial engagement of the outer surface of the blowing element and the curved inner surface portions of each bearing shell, establishing thereby a positive force-transmission between the assembled elements.

12. In an air inlet through which supply air is blown into the room of a building or the like, preferably from the ceiling of the room, including at least one roller-shaped blowing element, having at least one passageway through which air may flow transversely to the longitudinal direction of the blowing element, and two mutually parallel disposed bearing shells between which the blowing element is mounted for pivotal motion about its longitudinal axis, the improvement comprising at least one spring clamp, wherein each bearing shell includes a curved inner surface portion which substantially conforms to the curvature of the outer surface of the blowing element wherein said at least one spring clamp engages both bearing shells for retaining said bearing shells in assembly with the blowing element such that the outer surface of the blowing element and the curved inner surface portion of each bearing shell assume a form-fitting relationship with at least a partial engagement of the outer surface of the blowing element and the curved inner surface portion of each bearing shell, establishing thereby a positive force-transmission between the assembled elements, wherein the blowing element is provided with notched indentations formed in its outer surface; and wherein at least one of the bearing shells has at least one detent projection formed on its curved inner surface portion for engaging said indentations so as to maintain the adjusted angular position of the blowing element.

13. The air inlet as defined in claim 12, wherein each bearing shell has a detent projection formed on its curved inner surface portion which extends over its length, and wherein the notched indentations of the blowing element extend over the length of its circumferential outer surface.

14. In an air inlet through which supply air is blown into the room of a building or the like, preferably from the ceiling of the room, including at least one roller-shaped blowing element, having at least one passageway through which air may flow transversely to the longitudinal direction of the blowing element, and two mutually parallel disposed bearing shells between which the blowing element is mounted for pivotal motion about its longitudinal axis, the improvement comprising at least one spring clamp having a substantially U-shaped cross section, wherein each bearing shell includes a rear end region, a side wall extending from the rear end region, a longitudinal slot in its side wall and a curved inner surface portion which substantially conforms to the curvature of the outer surface of the blowing element, said rear end region defining a terminus of the bearing shell situated upstream of the blowing element, wherein said at least one spring clamp engages both bearing shells for retaining said bearing shells in assembly with the blowing element such that the outer surface of the blowing element and the curved inner surface portion of each bearing shell assume a form fitting relationship with at least a partial engagement of the outer surface of the blowing element and the curved inner surface portion of each bearing shell, establishing thereby a positive force-transmission between the assembled elements, wherein the two legs of said U-shaped spring clamp are each provided with projections which in assembly engage a respective one of the longitudinal slots in the side wall of said bearing shells, and wherein said U-shaped spring clamp in assembly engages the rear end regions of the bearing shells such that the legs of said U-shaped spring clamp originate near the rear end regions of the bearing shells.

15. An air inlet means through which supply air is blown into the room of a building or the like for controlling the occurrence of the Coanda effect comprising, an elongated body having spaced walls which define a first air region and a second region lying parallel thereto and coextensive with said first air region, said second region having an inlet opening into said first air region and a longitudinally extending outlet area, a plurality of axially aligned air control means mounted and supported in said second region, each air control means having side walls which define an air passageway having an inlet opening and an outlet opening through which air from said first air region flows, and which converge at the inlet opening so that said inlet opening is narrower than said outlet opening, thereby controlling emission of air from the said first air region to a zone lying beyond said outlet opening, wherein the side walls of each air control means include converging projections at the inlet opening which extend outwardly from the side walls.

16. An air inlet as defined in claim 15, wherein said air control means are embodied as roller-shaped members, and wherein said projections have an arcuate shape.

* * * * *